June 21, 1932. T. ROBINSON 1,863,880
APPARATUS FOR MAKING PREPARED BUILDING PRODUCTS
Original Filed June 19, 1928 2 Sheets-Sheet 1
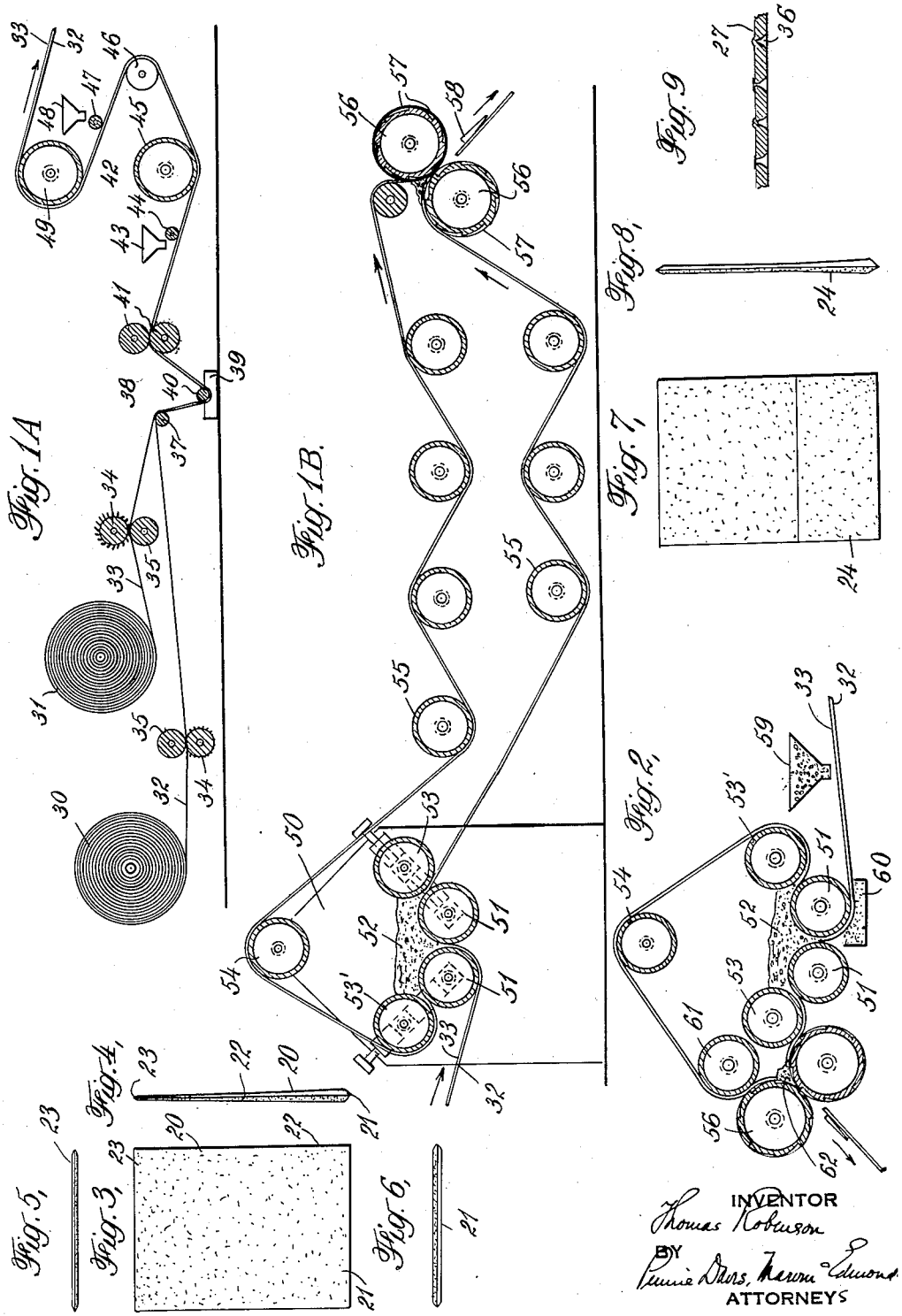

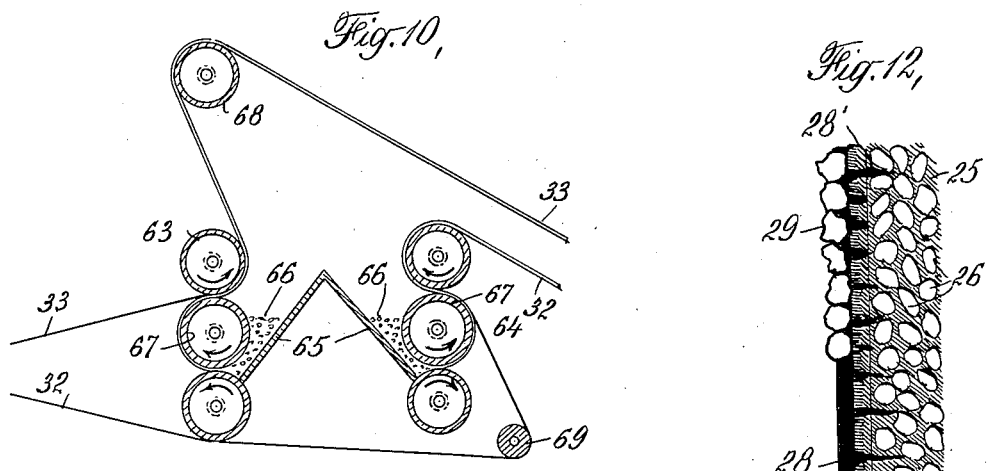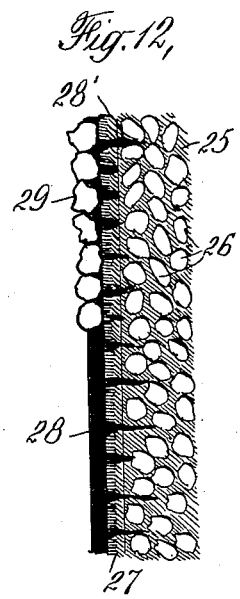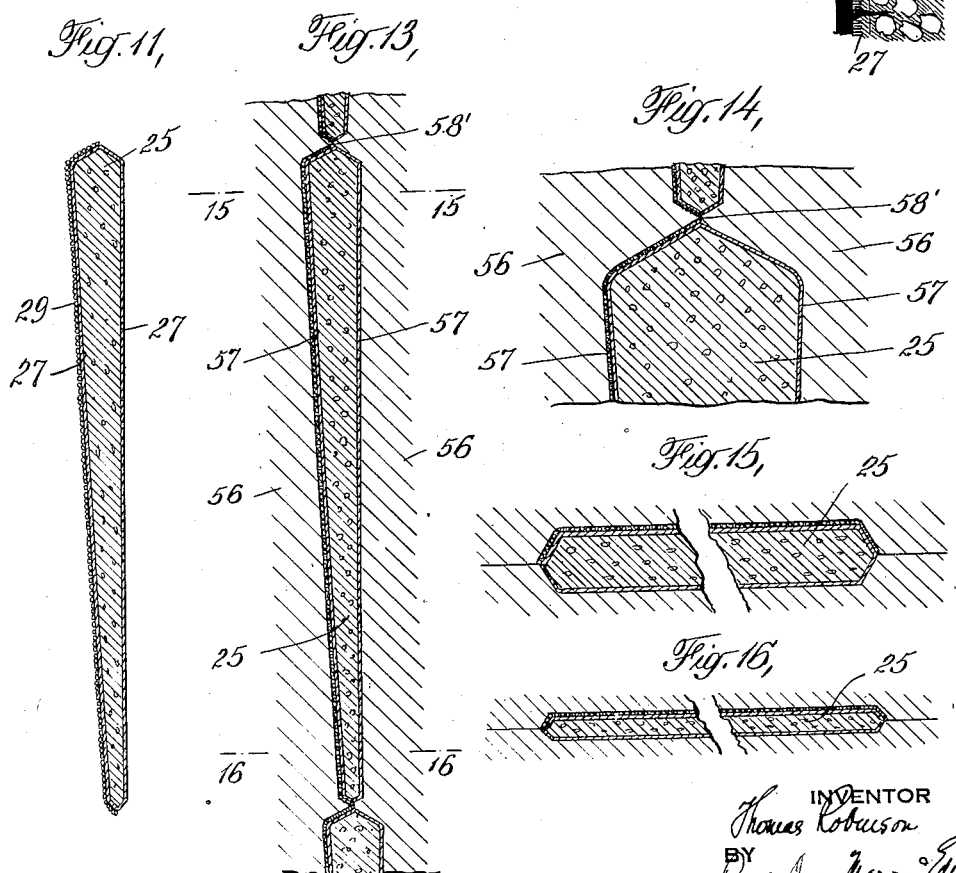

Patented June 21, 1932

1,863,880

UNITED STATES PATENT OFFICE

THOMAS ROBINSON, OF NEW YORK, N. Y., ASSIGNOR TO LANCASTER ASPHALT, INC., OF NEW YORK, N. Y., A CORPORATION OF DELAWARE

APPARATUS FOR MAKING PREPARED BUILDING PRODUCTS

Original application filed June 19, 1928, Serial No. 286,502. Divided and this application filed July 16, 1929. Serial No. 378,688.

This invention relates to apparatus for making building products capable of withstanding exposure to the elements and providing a water-proof structure, such that the products may be employed for roofing, siding, and other similar purposes. More particularly, the invention is concerned with apparatus for producing the new building material set forth and claimed in my co-pending application, Serial No. 286,502, filed June 19, 1928, of which the present application is a division. The product disclosed in that application may be made in various shapes and forms for different uses by means of this apparatus, but as the material is of particular utility and affords important advantages for roofing purposes, a form of the apparatus for producing the material in a shape suitable for that purpose will be described by way of illustration.

Prepared roofing now widely used in place of slate, wood shingles and the like, has numerous advantages and some disadvantages. It is cheaper than wood shingles, more resistant to fire and of at least equal durability, but one of the usual components of such roofing is rag felt which is relatively expensive. This felt forms the basis of the material and it is customarily saturated and coated with bituminous substances such as asphalt and then given a wear surface of crushed slate, etc. As the felt, even in the heaviest and most expensive grades is relatively thin, a roofing element with a felt base is likewise thin and the exposed butt does not cast any considerable shadow so that the appearance of a roof laid with these elements is less attractive than that of a wood shingle or tile roof. Furthermore, the felt which represents the greatest item of expense in the manufacture of this roofing is itself the least durable part and in the course of time, the felt deteriorates and rots due to exposure to the weather, the edges of the elements warp and curl making them unsightly and sometimes causing leaks, and in the course of time, the felt disintegrates.

The present invention is directed to the provision of apparatus by which the novel roofing material of the prior application may be made at a lower cost than prepared roofing which employs felt as a foundation member or base. This apparatus is suitable for the production of this material in different shapes and sizes and in particular in the form of thick butt shingles. The new product which this apparatus is adapted to make represents a departure from hitherto accepted practice in that, while felt or similar material is employed, it is not used as the base or body, but that base is a hardened mastic protected and preferably wholly enclosed in a jacket of thin sheet material which may be felt of a weight much less than that used in ordinary commercial roofing.

The mastic I prefer to use to form the core or base of the new product is a mixture in suitable proportions of a bituminous compound such as asphalt, and granular material or grit, such as crushed rock, crushed slate, sand and other similar substances. In some instances, it may be desirable to use infusorial earth, asbestos sand, fibrous asbestos and the like in addition to or in place of the granular material, to produce articles of different weights and other characteristics, and these ingredients are satisfactory for such special purposes. This mastic core is enclosed wholly or in part by fibrous sheets, preferably rag felt, which is not saturated except as an incident to other operations. These sheets form a jacket for the core, adding to its strength and durability, defining its shape and carrying the gritty wear material affixed thereto by a suitable adhesive such as an asphalt coating.

The apparatus of the present invention comprises means by which a web of unsaturated felt is drawn from a supply and given a coating of asphalt or the like on one surface. In the ordinary roofing machines, such felt is saturated with a low melt point asphalt before any other operation is performed on it, and after this, the felt is cooled and a coating of asphalt is applied of a higher melt point than the saturant in which the wear surface is to be embedded. In the new apparatus, however, the unsaturated felt receives the coating of asphalt at once, then the wear surface is applied, and this coating material is put on in a condition such that it enters into the pores of the felt to a substantial distance. The felt used is relatively very thin so that this coating may readily seep partly through the felt without difficulty.

After the coating operation, a layer of mastic in more or less fluent condition is applied to the desired thickness on the face of the felt opposite to that coated. This layer of mastic is of substantial thickness but is applied in such condition that the asphaltic component may enter into the felt. By properly controlling the application of coating and mastic and the fluidity thereof, it is possible to insure that the coating compound and the plastic ingredient of the mastic, which are the same and preferably asphalt of the same melting point will extend entirely through the felt and unite to produce complete saturation. After the sheet has received its mastic facing, it is cooled so that the mastic receives an initial set. Then a pair of such sheets are placed together with their mastic coatings between, and shaping and cutting operations are performed to unite the sheets into a single element of the desired form and size. In the finished product, the mastic forms the base, and upon each face is a layer of felted fibres. Through this layer extends the asphaltic compound in a substantially continuous mass from the core to the outer layer carrying the wear surface. The felted sheets forming the jacket are thus fully impregnated and saturated and this result is obtained without performing a separate operation for the purpose.

The apparatus of the present invention includes many features of novelty in addition to those briefly referred to and will be better understood upon reference to the accompanying drawings, in which Figs. 1A and 1B together illustrate somewhat conventionally the layout in side elevation of the apparatus for producing the new elements;

Fig. 2 is a view in side elevation of modified apparatus for the same purpose;

Figs. 3 and 4 are views in plan and side elevation, respectively, of one of the new elements in the form of a shingle;

Figs. 5 and 6 are views of the thin and butt ends, respectively, of the new element;

Figs. 7 and 8 are plan and side views, respectively, of a modified form of the element;

Fig. 9 is a detail of the apparatus;

Fig. 10 is a view in side elevation of a part of a modified form of the apparatus;

Fig. 11 is a sectional view of a new element;

Fig. 12 is a sectional view illustrating the manner in which the felt is impregnated;

Fig. 13 is a sectional development view of a part of the shaping apparatus;

Fig. 14 is a sectional view of a part of the apparatus shown in Fig. 13; and

Figs. 15 and 16 are sectional views on the lines 15—15 and 16—16, respectively, of Fig. 13.

In these drawings, the element 20 is illustrated in Figs. 3—6, inclusive, in a form appropriate for use as a shingle. This element is rectangular but its width may lessen toward the thick or butt end 21. The element also tapers in thickness from the rear edge 23 which is the end normally concealed toward the butt or exposed end 21. In a modified form shown in Figs. 7 and 8, the element is of substantially uniform width and thickness from the rear end forward to an imaginary transverse line defining the normal exposure, forward of which the element increases in thickness as indicated at 24, and may decrease in width. The elements are placed on the roof in the usual courses and each element lies with its side edges at the rear end in contact with the side edges of an adjacent element.

Each element comprises a mastic core or base 25 (Figs. 11, 12) which is made up of a mixture of ingredients previously mentioned. The mastic illustrated by way of example preferably includes particles of grit 26, termed a mineral aggregate, fibrous material, and a binder or vehicle, preferably asphalt of a suitable melting point. This mastic forms the core or body of the element, and covering each face and also preferably the end and side edges is a jacket of felted fibres 27 firmly adherent to the core and provided with a coating 28 of asphalt or the like, in which are partially submerged or embedded particles 29 constituting a wear surface. Crushed slate is an example of the granular material frequently used for such a surface, and this may also be used for the aggregate in the mastic, though there are other mineral materials equally suitable and somewhat cheaper such as crushed rock, or sand. In place of crushed mineral material or in addition thereto, fibrous material, ground cork and the like may also be employed.

The jacket 27 is preferably made in two pieces, the edges of which may meet without substantial overlap in the median plane of the element. By making the jacket in two pieces, the edges of which meet without substantial overlap, it is possible to produce these elements by a continuous process using certain rotary elements which perform operations without interrupting the progress of the materials, and at the same time apply the jacket so that it covers both faces and all edges of the core and completely encloses it.

The jacket material employed may be of different materials, such as paper of relatively heavy weight, but I prefer to use a light felt produced of rags and similar materials on a paper machine, such felt consisting of felted fibres which provide a porous and absorbent layer. The felt used however is not comparable in thickness or weight with felts used for standard roofing purposes, but is quite thin, and may vary in weight from 10 to 25 pounds to the unit of 480 square feet, while standard roofing felt varies in weight from 20 to 60 pounds for the same unit. The jacket felt is thus very thin and porous, readily shaped and easily impregnated.

The new element is made by a process which may be said to involve the application of a coating of asphalt and wear material to one face of a web of this thin felt, the asphalt being applied at a temperature and in amounts such that the asphalt is fluent enough to enter the pores of the felt to a substantial depth. After the wear surface has been applied over this coating, a layer of mastic containing asphalt of the same melt point as that used in the coating is applied on the opposite face of the felt to form a layer of considerable thickness. The mastic is applied at a temperature such that the asphalt therein is relatively fluent and enters the pores of the felt to a depth such that it completes the impregnation thereof, and unites with the asphalt from the coating so that the felt coated on both sides may be described as made up of a mastic body with an asphalt coating carrying granular wear material with a thin layer of felted fibres interposed between the mass of mastic and the coating layer. Following the application of the mastic, the felt is completely impregnated and saturated and firmly bound thereto.

To complete the element, two webs of felt treated as above described are brought into juxtaposition with the mastic layers in contact, then compression is applied to unite the mastic bodies into a single core and to shape the core and jacket, and simultaneously with the shaping operation, the felt webs are severed around the outlines of the formed core to complete the product. In the shaping operation, the jacket sheets are forced into contact at the edges of the shaped core, and severed along the line of contact. This produces a completely jacketed core, without substantial overlap of the jackets, and permits the shaping and severing operations to be carried on by rotary molding and cutting rolls, which produce a completely enclosed core.

The apparatus used for manufacturing the material may take different forms, one convenient and inexpensive type of apparatus being shown in Figs. 1A and 1B. In these figures there are illustrated the two webs of jacket material 30 and 31, mounted on suitable supports so that the webs may be drawn from them without difficulty. Each web 32, 33 passes from its roll through a pair of rolls 34, 35, each roll 34 being provided with a multiplicity of fine spikes, while the corresponding roll 35 has a more or less yielding surface of rubber, leather or wood. The felt passing between these rolls is punctured at a multiplicity of points and each spike 36 (Fig. 9) is so shaped that as it passes through the felt, it roughens the surface beyond which the spike projects. The rolls 34, 35 are so placed that the face of the felt so roughened is the face to which the mastic is applied. The projecting or roughened parts of the felt then enter the mastic layer and increase the strength of the bond between the mastic and felt. Also the openings in the felt assist in the saturation of the felt and permit solid tongues 28' of asphalt to extend directly therethrough to meet and unite with the asphalt coating layer.

Beyond the perforating devices, the two webs of felt are brought together and pass around a guide roll 37 forming part of a coating mechanism generally designated 38. Standard apparatus well known in the art may be used for this purpose. As illustrated diagrammatically, the two webs of felt, face to face, are led through a vat 39 of coating material beneath a guide roll 40, and a coating material applied to the outer faces and edges. From the vat, the webs pass through rolls 41, which remove excess coating material. The coating material which is preferably asphalt of a melt point sufficient to withstand solar heat is maintained at a suitable temperature in the vat, so that the asphalt will flow readily and thus enter the pores of the felt to a substantial depth.

From the coater, the webs pass to mechanism generally designated 42, for applying wear material to the coatings. The details of such mechanism are well known, though these details have here been modified and utilized in a novel way so that surfacing material is applied to opposite faces of the double web. The two webs pass beneath a hopper 43 beneath which is a distributing roll 44, and a layer of the surface grit is spread evenly over the upper surface of the web 33, this grit being partially submerged or embedded in the coating by the roll 45 under which the webs pass. This roll may be hollow and water-cooled so that it gives the coating an initial set at the same time the grit is embedded. The webs now pass around a guide roll 46, so that the web 32 is uppermost and grit is applied to it by the distributing roll 47 receiving grit from the hopper 48. The web now passes around the roll 49 similar to the roll 45, which embeds the grit and sets the coating. The webs then pass to the mechanism for applying the mastic.

This mechanism generally designated 50 includes a pair of rolls 51, 51 placed with their surfaces close together, and the webs 32, 33 pass upwardly between these rolls and are then separated. A supply of the mastic 52 is maintained in the bight of the rolls and kept in place by suitable end plates, not shown. As the webs separate and pass one around each roll 51, the uncoated faces of the webs come in contact with the relatively fluent mastic and pick up a layer thereof. Placed to one side and above each roll 51, is a roll 53, 53' journalled in bearings which are adjustable with respect to the bearings for the rolls 51 so that the distance between the surfaces of roll 51 and roll 53, 53' may be varied. Each web is led around the surface of a roll 51, picking up a coating of mastic, then between the roll 51 and its associated roll 53 or 53'. The distance between the surface of roll 51 and roll 53, for example, determines the thickness of the layer of mastic carried off by the web 32, excess mastic being returned to the supply 52. The web 33 passes over its roll 51, then between that roll and roll 53', whereby the thickness of the mastic layer is determined, then around that roll to an upper guide roll 54.

The various rolls 51, 53, 53' and 54 are hollow and arranged so that they may be heated or cooled as may be necessary, and the supply of mastic 52 is kept at a temperature such that the asphaltic ingredient is sufficiently fluent so that it will penetrate the roughened surface of the felt and complete the saturation thereof. Also such of these and other rolls in the apparatus as may be necessary, are driven to cause the felt to advance from its supply through the machine. As the coating asphalt and that in the mastic are preferably the same, they unite in the felt so that there is a substantially continuous asphaltic mass extending through the felted fibres from one face to the other.

From the mastic applying mechanism, the two webs of felt are moved to cooling devices, taking the form of rolls 55, around which the two webs are led in a tortuous path. These rolls may be water-cooled so that the coating and the mastic will set partially. These rolls are used to the number desired or necessary to put the coated webs in suitable condition to be combined into building products.

The mechanism used for this purpose is similar to that set forth and described in my co-pending application, Serial No. 139,612, filed October 5, 1926. That mechanism includes a pair of rotary drums 56, having mold cavities 57 in their surfaces. The webs 32, 33 are brought together and pass between the rolls with their mastic layers in contact. The rolls are so shaped that they exert a pressure which consolidates the two mastic layers into a single core of final form, and the jacket webs conform to the shape of this core. Around their edges the mold cavities 57 have sharp edges which pinch the webs and sever them, so that the molding rolls not only form the single elements but cut the webs around the outlines of each element. The drums 56 thus rotate continuously and uniformly and produce finished elements 58 without interruption to the movement of the webs. Each element includes a body or core of mastic, which is completely encased in a jacket, and by reason of the choice of a two piece jacket, the edges of which meet in a plane without substantial overlap, the rotary forming operation is possible, resulting in a high output rate at low cost.

In Fig. 2, there is illustrated a somewhat more compact form of the apparatus. Here the coated webs 32, 33 pass beneath apparatus 59 for applying grit to the upper web 33, then to apparatus 60 for applying grit to the under surface. The grit is embedded in each coating by the passage of the webs between rolls 51 after which the webs are separated and receive the coating of mastic from supply 52. The coated webs now pass directly to the molding drums 56, and the web 32 is guided thereto by roll 53, while web 33 passes around roll 53', guide roll 54 and a floating roll 61 to the drums. The action of the drums may cause mastic to collect in their bight at 62 if excess above that required is carried by the webs. The roll 61 is therefore mounted to float and if mastic collects at 62 in too great amount, it will lift the roll 61 and be carried with roll 53 back to the supply 52.

In Fig. 10, there is illustrated in side elevation a modified form of the apparatus, involving the use of two groups of rolls 63 and 64, arranged three high. Each group of rolls is supplied with mastic in any convenient manner, for instance, by placing a container for mastic adjacent each group, one side of each container being defined by the rolls. For this purpose, a pair of downwardly diverging partitions 65 may be used as indicated provided with end plates not shown, and holding quantities of mastic 66 in contact with the surfaces of the two lower rolls of each group. The web 33 is laid between the two upper rolls of the group 63. The middle roll 67 of this group is spaced from the lower roll and is driven at a higher speed than the top and bottom rolls. The roll 67 picks up a layer of mastic from the supply 66 and carries this layer around in contact with the web 33, spreading the mastic on that web with a wiping motion as the roll revolves. The amount of mastic so applied will depend upon the spacing of the middle roll from the top roll and bottom roll. The rolls are journaled in bearings capable of adjustment, so that the thickness of the mastic layer applied to the web can be varied as desired. The coated web passes around the top roll of the group 63 and then around a roll 68 and from there is led directly to the forming rolls 56, or it may pass around cooling rolls 55 as desired.

The web 32 passes around a guide roll 69 and then upwardly between the middle roll and the top roll of the group 64. The rolls of this group are arranged in the same manner and perform the same function as the rolls in the group 63, and, from the top roll of this group, the coated web passes either directly to the forming rolls 56, or to cooling rolls 55. It will be noted that mastic is applied to the under surface of the web 33 and to the upper surface of the web 32 by the wiping action of the rolls 67.

It will be seen that the new product can be produced rapidly according to the process described, and the apparatus required is of simple construction and low cost. Apparatus such as that illustrated in Figs. 1A and 1B will occupy floor space not greatly in excess of 60 feet long and of width not much greater than the units to be produced, whereas standard roofing equipment of the type now generally used is over 100 feet long, and includes numerous expensive parts. Since the present product utilizes unsaturated felt, and the felt is saturated as an incident to other operations, the usual saturating equipment is dispensed with, thus reducing the cost and saving space.

While the new product has been illustrated in the form of a single shingle, it may be produced in the form of strip shingles by using molding drums of appropriate form as illustrated in my co-pending application above referred to. It may also be produced without difficulty in numerous other forms for special purposes.

In Fig. 12, I have illustrated a part of the new element in section and on an enlarged scale. The felt jacket 27 is shown as lying between the mastic 25 on one side and the coating layer 28 on the other and due to the porosity of the felt and its perforation, the asphalt in mastic and coating has united so that the felt is completely impregnated and the core and coating form an integral unit. This effect is increased by the tongues 28' of asphalt which extend through the perforations between the coating and core. Accordingly, the new element in final form includes a core, a jacket completely encasing the core, and a waterproof coating with wear material on the jacket and this product has been produced without starting with a saturated felt and without performing special saturating steps.

The present invention affords numerous advantages over the products, processes, and apparatus heretofore used, among which are the following:

By using unsaturated felt the cost of the final product is cut down and this reduction in cost is an important one, since the felt employed is thin and of light weight. The production cost is also reduced since the material is converted from unsaturated felt to finished shingles in what amounts to a single continuous operation, there being no interruption in the travel of the felt through the apparatus. In the new process, the felt and mastic are at practically the same temperature when acted on by the forming and shaping rolls and since the felt is warm it may be appropriately shaped by these rolls without injury to the felt and without cracking the sealing coating in which the wear material is embedded. This wear material is also firmly affixed to the felt since it passes through two sets of rolls which act upon it and embed it in the sealing coating. The application of the mastic to the felt itself in a layer of regulated thickness insures a uniform supply of mastic to the forming rolls where the core is shaped to final form, and the mastic at the time it reaches these forming rolls has been subjected to a partial compression to eliminate voids so that the final pressing operation results in products of the highest grade. Also, by reason of the use of unsaturated felt, on one face of which mastic is applied, the binder in the mastic is forced into the fibres of the felt and unites with the sealing coating, both the mastic and sealing coating being warm at the time of the final forming operation, and this prevents any separation or delamination of the felt from the core.

The new product is relatively cheap and it may be made in shingles and building products of any shape and form. Shingles made by the new procedure are particularly desirable since they may have the thick butt, so desirable in roofing products, and not obtained with the ordinary commercial roofing. The thickness of the butt does not increase the cost to any substantial extent, since the body of the new shingle is made of a relatively inexpensive mastic and the amount of felt or jacketing material used does not vary substantially whether the products are thick or thin.

While I have described the method of utilizing the unsaturated felt in a product in which the core is completely encased by the jacket, it will be apparent that the same method may also be used to advantage in the production of jacketed elements of other types such as those shown in my Patent No. 1,585,692, issued May 25, 1926.

What I claim is:

1. Apparatus for the production of products for building and similar purposes, which comprises means for placing a web in longitudinal movement, a coating mechanism for applying sealing material to one face of the web, means for applying a layer of mastic material of selected thickness to the other face of the web, means operatively interposed between the coating mechanism and the layer-applying means for cooling to a preselected temperature the web and the material carried thereby, and means for applying pressure to the opposite faces of the web to force the coating and wipe the mastic into the web to a substantial depth.

2. Apparatus for the manufacture of products for building and similar purposes, which comprises the combination of means for applying to one face of a moving web a coating of sealing material in relatively fluent condition, means for applying mastic in relatively fluent condition to the other face of the web, to form a layer of selected thickness, means operatively interposed between the coating-applying means and the mastic-applying means for cooling the web and material carried thereby, and a mechanism for subjecting the coated web to pressure to force the mastic and coating into the web to bring about its substantially complete impregnation thereby.

3. Apparatus for the manufacture of products for building and similar purposes, which comprises the combination of means for applying coating material to one face of a web, this coating material being in relatively fluent condition, means for applying a mastic including a relatively fluent ingredient to the other face of the web to form a layer of selected thickness, means operatively interposed between the coating-applying means and the mastic-applying means for cooling to a preselected temperature the web and material carried thereby, and a pressure mechanism for subjecting the coated web to pressure to force the coating and fluent ingredient of the mastic into the web a substantial distance.

4. Apparatus for the manufacture of products for building and other purposes, which comprises the combination of means for roughening one surface of a web of fibrous material, means for applying a sealing compound to the other face of the web, this sealing compound being in relatively fluent condition, means for applying a layer of mastic including a relatively fluent ingredient to the roughened face of the web to form a layer of selected thickness, means operatively interposed between the sealing compound-applying means and the mastic layer-applying means and adapted to cool to a preselected temperature the web and material carried thereby, and pressure devices operable to subject the coated web to pressure to force the fluent ingredient of the mastic and the sealing coating into the web to effect impregnation thereof.

5. Apparatus for the manufacture of products for building and similar purposes, which comprises the combination of means for perforating a fibrous web and at the same time roughening one surface thereof, coating mechanism for applying a sealing coating in relatively fluent condition to the smooth surface of the web, means for applying a layer of mastic including a fluent ingredient to the roughened surface of the web to form a layer of selected thickness, and means for subjecting the coated web to pressure to force the sealing coating and the fluent ingredient of the mastic into the web to impregnate the latter.

6. Apparatus for the manufacture of products for building and similar purposes, which comprises the combination of means for applying a sealing coating to one face of each of a pair of webs, separate means for applying a layer of mastic to the other face of each web, cooling means operatively interposed between the coating-applying means and the mastic layer-applying means, and means for placing the webs with their mastic coatings in contact and subjecting the webs and the mastic to pressure to cause the mastic layers to unite and to shape the webs and mastic to a predetermined shape.

7. Apparatus for the manufacture of products for building and similar purposes, which comprises the combination of means for placing a pair of webs with one face of each in contact and means for applying a coating material to the exposed face of each web, means for separating the webs and applying a layer of mastic material of regulated thickness to the uncoated face of each web, means operatively interposed between the coating-applying means and the mastic material-applying means adapted for cooling the web and material carried thereby to a preselected temperature, and means for placing the webs together with their mastic coated faces in contact and subjecting the webs and mastic to pressure to cause the mastic layers to unite and to form the webs and mastic to a predetermined form.

8. Apparatus for the manufacture of products for building and similar purposes, which comprises the combination of means for moving a pair of webs with one face of each in contact through a supply of sealing material to cause the exposed face of each web to receive a coating thereof, means for separating the webs and applying mastic including a relatively fluent ingredient to the uncoated face of each web to form a layer of regulated thickness, means operatively interposed between the sealing material-applying means and the mastic-applying means and adapted for cooling to a preselected temperature the respective webs and material carried thereby, means for bringing the webs together with their mastic layers in contact, and means for compressing the webs and mastic to consolidate the mastic into a single mass, to shape the webs and mastic to a predetermined form and to sever the webs along the outlines of said form.

9. Apparatus for the manufacture of products for building and similar purposes, which comprises the combination of means for applying a layer of mastic to one face of each of a pair of webs, means for cooling the mastic to give it an initial set, and means for placing the webs with their mastic layers in contact and for applying pressure to the webs to consolidate them and the mastic carried thereby into a single mass and to shape the webs and mastic.

10. Apparatus for the manufacture of products for building and similar purposes, which comprises the combination of separate means operating on each of a pair of webs independently for applying a layer of mastic of preselected thickness to one face of each web under pressure with a wiping motion, and means operable to engage the coated webs to bring their mastic layers into contact and to unite the webs.

11. Apparatus for the manufacture of products for building and similar purposes, which comprises the combination of separate rotary means operating on each of a pair of webs for applying a layer of mastic to one face of each web with a wiping motion, and means acting on the coated webs to bring their mastic layers into contact and to shape the webs and mastic to a selected form.

12. Apparatus for the manufacture of products for building and similar purposes which comprises the combination of means for directing a continuous web of fibrous material at a uniform rate in a predetermined path, means for uniformly perforating the web, means for coating one side of the web with material in liquid form, means for bringing the thus-coated web to a preselected temperature, pressure-applying means for applying with a wiping motion a relatively thick layer of mastic to the side of the web opposite that having the said coating and for forcing portions of the mastic into the fibers of the web and through the perforations therein, and means for cooling the thus-coated web.

13. Apparatus for the manufacture of products for building and similar purposes which comprises the combination of means for directing a continuous web of fibrous material at a uniform rate in a predetermined path, means for uniformly perforating the web, means for coating one side of the web with material in liquid form, pressure applying means for applying with a wiping motion a relatively thick layer of mastic to the side of the web opposite that having the said coating and for forcing portions of the mastic into the fibers of the web and through the perforations therein, and means for cooling the thus-coated web.

14. Apparatus for the manufacture of products for building and similar purposes, which comprises the combination of means for directing a pair of continuous webs of fibrous material,—each having one face thereof in contact with a face of the other web,—through a supply of liquid sealing material thereby coating the exposed face of each of the said webs with the sealing material, means for separating the thus-coated webs, means for applying to the uncoated face of each web a layer of mastic material of regulated thickness including a normally liquid ingredient, means operatively interposed between the web coating means and the mastic-applying means and adapted for cooling to a preselected temperature each web and the material carried thereby, means for superposing one of the webs upon the other with the respective mastic layers in contact, the last-named means having operatively associated therewith means for compressing the webs and mastic to consolidate the mastic into a single mass of preselected thickness and form, and means for severing the respective webs along the outlines of the said form.

15. Apparatus for the manufacture of products for building and similar purposes, which comprises the combination of means for directing a pair of continuous webs of fibrous material, each having one face thereof in contact with a face of the other web, through a supply of liquid sealing material thereby coating the exposed face of each web with the sealing material, means for separating the thus-coated webs, means for applying to the uncoated face of each web a layer of mastic material of regulated thickness including a normally liquid ingredient, means operatively interposed between the web-coating means and the mastic-applying means for cooling to a preselected temperature each web and the material carried thereby, and rotary molding and cutting rolls adapted to simultaneously bring the respective webs together with their mastic layers in contact to shape the webs and the inner mastic core to a preselected form and size, and to sever the same along the outlines of the said form.

In testimony whereof I affix my signature.

THOMAS ROBINSON.